(12) United States Patent
Yokoyama

(10) Patent No.: US 8,341,483 B2
(45) Date of Patent: Dec. 25, 2012

(54) DATA RETRANSMISSION METHOD AND RADIO COMMUNICATION SYSTEM USING THE SAME

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 12/615,478

(22) Filed: Nov. 10, 2009

(65) Prior Publication Data

US 2010/0058137 A1    Mar. 4, 2010

Related U.S. Application Data

(63) Continuation of application No. PCT/JP2007/000539, filed on May 21, 2007.

(51) Int. Cl.
 *G06F 11/00* (2006.01)
(52) U.S. Cl. .......................................... 714/749; 714/751
(58) Field of Classification Search .................. 714/748, 714/749, 751
See application file for complete search history.

(56) References Cited

U.S. PATENT DOCUMENTS

| | | | |
|---|---|---|---|
| 7,031,419 B2 * | 4/2006 | Piirainen | 375/358 |
| 7,391,755 B2 * | 6/2008 | Gopalakrishnan et al. | 370/334 |
| 7,493,092 B2 * | 2/2009 | Shida et al. | 455/103 |
| 7,646,744 B2 * | 1/2010 | Li | 370/328 |
| 7,817,741 B2 * | 10/2010 | Hayase et al. | 375/267 |
| 7,826,871 B2 * | 11/2010 | Sudo | 455/562.1 |
| 7,974,243 B2 * | 7/2011 | Nagata et al. | 370/334 |
| 2005/0101259 A1 * | 5/2005 | Tong et al. | 455/69 |
| 2006/0270427 A1 | 11/2006 | Shida et al. | |
| 2009/0135944 A1 * | 5/2009 | Dyer et al. | 375/267 |
| 2010/0023830 A1 * | 1/2010 | Wengerter et al. | 714/748 |
| 2010/0042881 A1 * | 2/2010 | Wong | 714/748 |
| 2011/0246847 A1 * | 10/2011 | Jin et al. | 714/749 |
| 2011/0280188 A1 * | 11/2011 | Jeon et al. | 370/328 |

FOREIGN PATENT DOCUMENTS

| | | |
|---|---|---|
| JP | 2004-40232 | 2/2004 |
| JP | 2004-112098 | 4/2004 |
| JP | 2006-165970 | 6/2006 |
| JP | 2006-333283 | 12/2006 |
| JP | 2007-74171 | 3/2007 |
| WO | 2006/057195 | 6/2006 |

OTHER PUBLICATIONS

International Search Report for corresponding International Patent Application No. PCT/JP2007/000539, with a mailing date of Aug. 21, 2007. 3GPP TR 25.876 V1.8.0 (Oct. 2005); Technical Report; 3rd Generation Partnership Project; Technical Specification Group Radio Access Network; "Multiple-Input Multiple Output in UTRA"; dated Oct. 2005.
Notification of Reason for Rejection issued for corresponding Japanese Patent Application No. 2009-515005 dispatched on Mar. 13, 2012 with English translation.

* cited by examiner

*Primary Examiner* — Marc Duncan
(74) *Attorney, Agent, or Firm* — Myers Wolin, LLC

(57) ABSTRACT

A data retransmission method for a radio communication system, in which a plurality of data streams are transmitted from a plurality of transmission systems, the method includes when there is a transmission error in transmission data in any of the plurality of data streams, adaptively selecting beamforming or spatial coding for retransmission of the transmission data; and retransmitting the transmission data with transmission errors by using either of selected beamforming or spatial coding, wherein a criterion for adaptively selecting the beamforming or spatial coding is that by comparing a retransmission period with a prescribed fading speed, the beamforming is selected when the retransmission period is smaller than the prescribed fading speed, while the spatial coding is selected when the retransmission period is smaller than the prescribed fading speed.

8 Claims, 19 Drawing Sheets

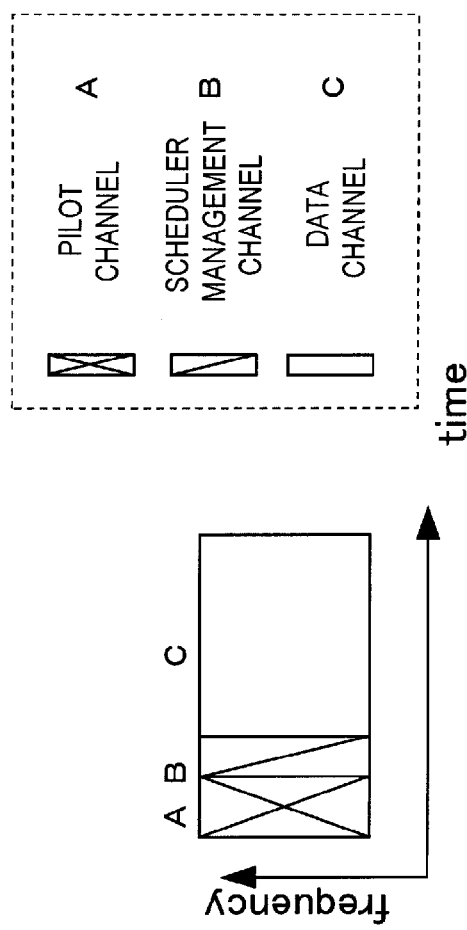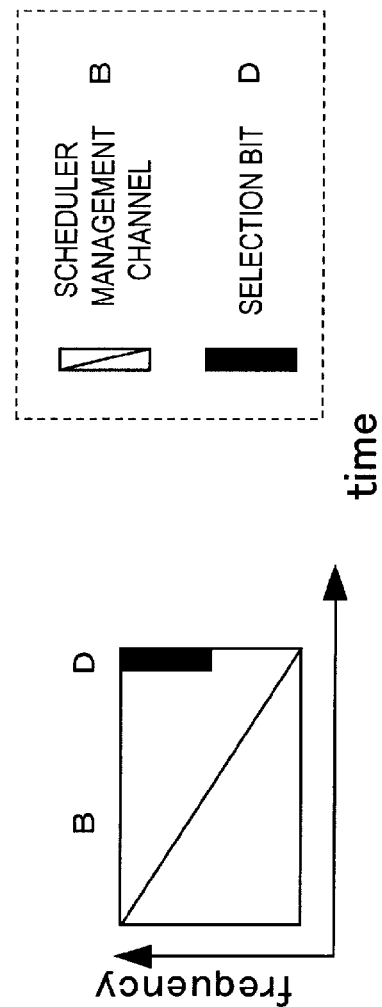

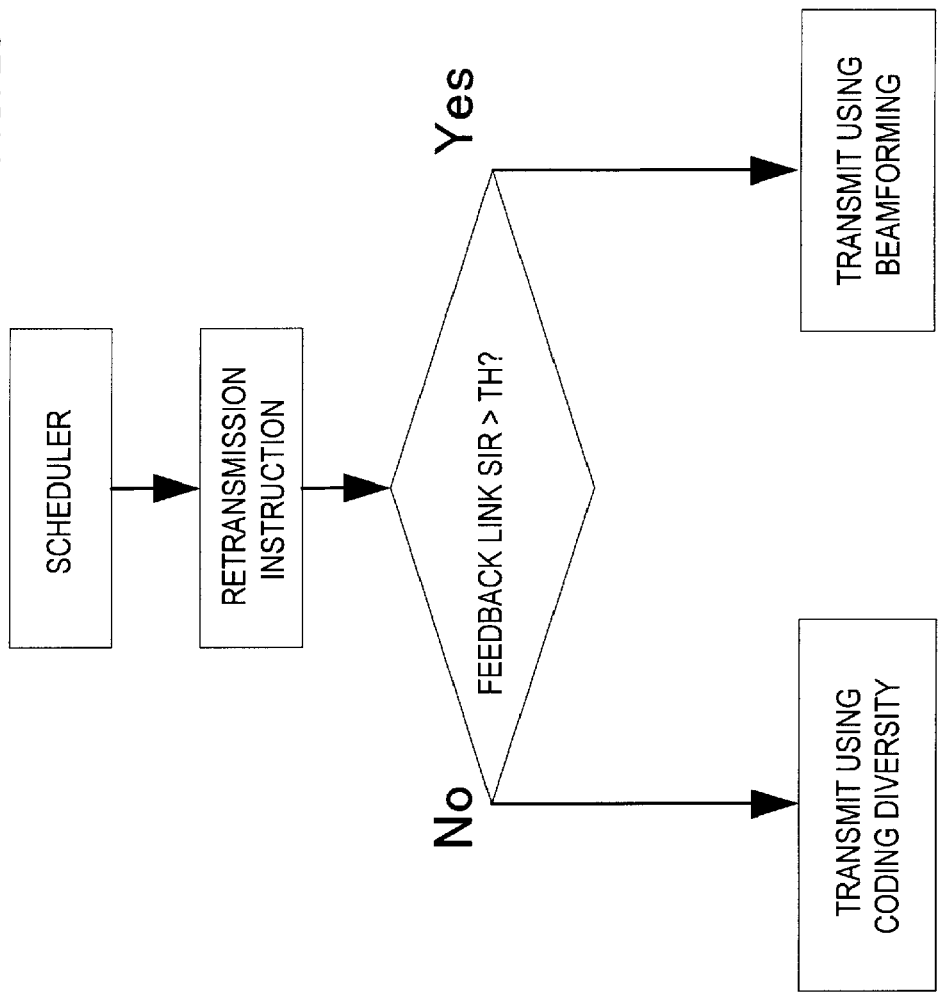

DATA RETRANSMISSION METHOD AND RADIO COMMUNICATION SYSTEM USING THE SAME

CROSS REFERENCE TO RELATED APPLICATIONS

This application is a continuation of International Application No. PCT/JP2007/539, filed on May 21, 2007, now pending, herein incorporated by reference.

FIELD

The present invention relates to a data retransmission method, and to a radio communication system employing the same.

BACKGROUND

In recent years, MIMO (Multi-Input Multi-Output) technology has been studied for application to mobile communication systems which are radio communication systems, as means of greatly improving communication throughput. Among such MIMO technologies, PARC (Per Antenna Rate Control) technology ("3GPP TR25.876") is attractive, which measures propagation quality between transmission and reception antennas, and adaptive modulation is performed according to each propagation quality of the transmission and reception antennas to optimally allocate transmitting resource.

PARC technology handles transmission rates independently for each of multiple antennas, and with respect to retransmission as well, a Cyclic Redundancy Check (CRC) can be added at each transmission antenna and retransmission controlled independently to promote improvement of communication efficiency.

In Japanese Laid-open Patent Publication No. 2004-112098, an invention is proposed relating to retransmission of MIMO technology which enables different transmission weighting from the initial transmission and obtaining of diversity gain.

SUMMARY

However, in the description of Patent Reference 1, there is no discussion of PARC performing retransmission for each transmission stream, and there is inadequate discussion of retransmission methods when one stream or a plurality of streams are erroneous during transmission of a plurality of streams.

Hence an object of the present invention is to provide a data retransmission method capable of ensuring QoS (Quality of Service) for services for which retransmission delays cannot be allowed (multicast broadcasts, television conversations, games), as well as a radio communication system employing such a method.

A first mode of a data retransmission method which attains this object of the present invention is a data retransmission method, in a radio communication system having a plurality of transmission systems corresponding to each antenna, in which adaptive modulation is performed according to the propagation quality of each transmission antenna, and a plurality of data streams are transmitted from the plurality of transmission systems, and when there is a transmission error in transmission data in any of the plurality of data streams, transmission data in which the transmission error occurred is simultaneously retransmitted by at least two transmission systems of the plurality of data streams.

Adding to the above characteristics, as a further detailed structure, the following data retransmission method includes: determination of the order of retransmission of the erroneous transmission data when there is a transmission error at least two data streams among the plurality of data streams; retransmitting the erroneous data in the decided order, using two or more of the transmission systems.

Alternatively, the data transmission method includes: determination of the order of retransmission of the erroneous transmission data when there is a transmission error at least two data streams among the plurality of data streams; retransmitting the erroneous data in the decided order, using two or more of the transmission systems.

Through the above characteristics, when in this invention retransmission is performed under circumstances in which errors occur in a certain stream portion, by retransmitting the symbols of the stream in which the errors occurred to all antennas, the reoccurrence of errors during retransmission can be prevented, and QoS (Quality of Service) can be ensured for services (multicast broadcasts, television conversations, games). Hence through application of this invention, a data retransmission method with high throughput, and a mobile communication system employing this method, can be provided.

BRIEF DESCRIPTION OF THE DRAWINGS

FIG. 1 is employed and there are no reception errors.

FIG. 17 shows an example of a frame format configuration used when performing adaptive modulation using the scheduler.

FIG. 18 is a diagram for explaining an example where a selection bit D is inserted into a portion of the scheduler management channel B and is transmitted to the receiver side.

FIG. 26 shows a third transmission method selection/judgment flow for a retransmission period, using as a criterion the fading speed.

DESCRIPTION OF EMBODIMENTS

Embodiments of the present invention is to facilitate understanding of the invention, the PARC concept is first explained.

Figure 1:
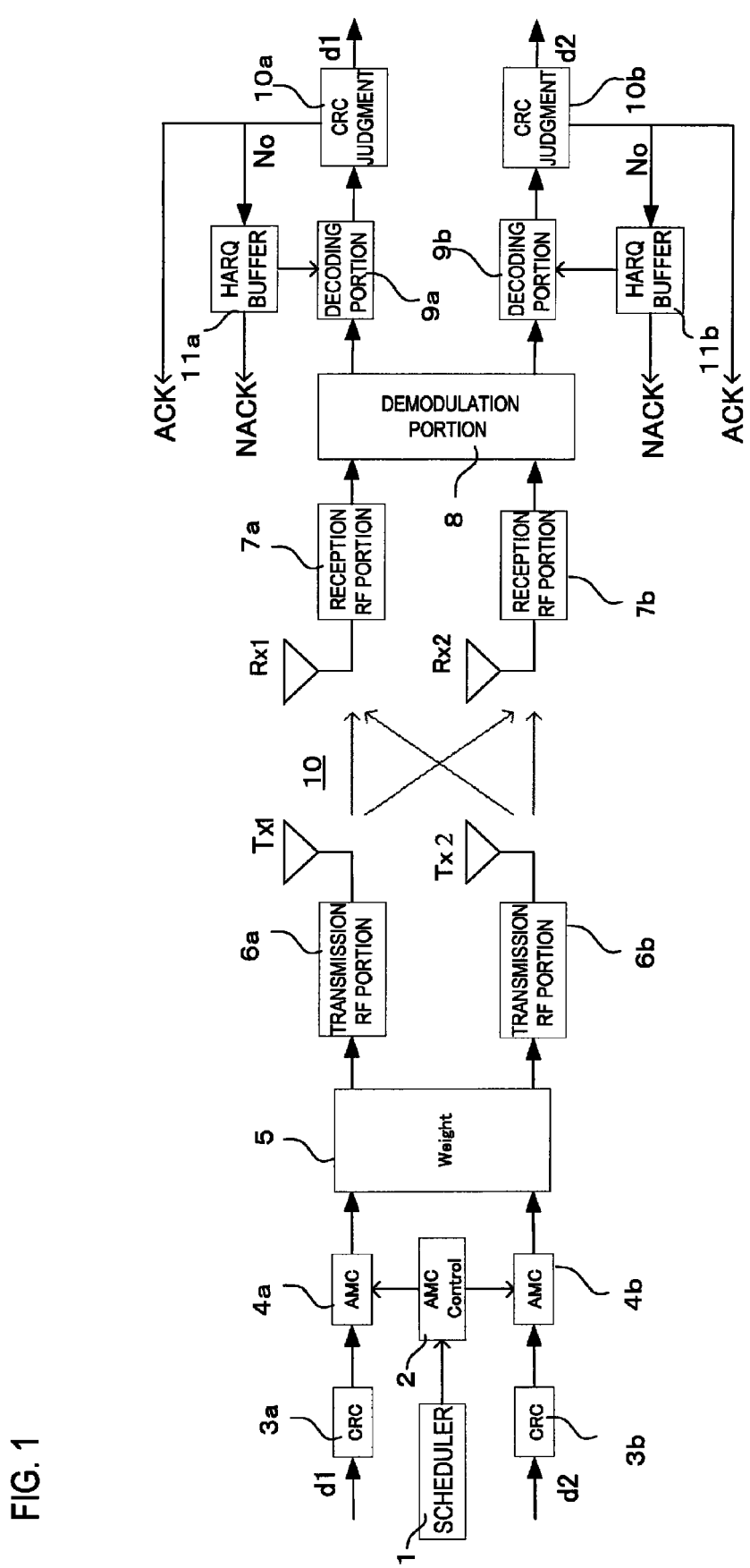
FIG. 1 illustrates the PARC concept.

FIG. 1 illustrates the PARC concept. In FIG. 1, MIMO multiplexing to transmit the data of two different data streams d1 and d2 to be transmitted is shown.

Control is performed by the AMC (Adaptive Modulation and Coding scheme) control portion 2 to subject each of these data streams d1, d2 to appropriate error encoding and modulation in the error encoding circuits 3a, 3b and adaptive modulation circuits 4a, 4b, according to instructions from a scheduler 1, and the transmission rate of each of the streams is specified.

When the streams are transmitted to each of the transmission antennas Tx1 and Tx2, the data streams d1 and d2 are passed through without special processing by the weighting portion 5, and are up-converted to the RF band by the transmission RF (Radio Frequency) portions 6a, 6b and are radiated.

Here, adaptive modulation is not performed only for each transmission antenna; PARC also includes cases in which adaptive modulation is performed for each beam when weighting is performed by the weighting portion 5 and transmission beams are generated. For this reason, the weighting portion 5 is shown in FIG. 1.

Signals which have passed through the radio propagation path 10 arrive at the reception antennas Rx1 and Rx2, are down-converted to the baseband (BB) by the reception RF portions 7a and 7b, are demodulated by the demodulation portion 8, and are decoded by the decoding portions 9a and 9b.

Decoded data is subjected to a cyclic redundancy check (CRC) for errors by the CRC judgment portions 10a and 10b, to determine whether errors are present. By performing this CRC judgment for each transmission stream, independent retransmission control of the separate transmission streams d1, d2 is performed.

An ACK or NACK signal is returned to the transmission source according to the CRC judgment result.

When the CRC judgment result indicates an error, a NACK signal is generated by the retransmission request (HARQ: Hybrid Automatic Repeat reQuest) portions 11a and 11b, and at the same time control is executed to invalidate the output of the decoding portions 9a, 9b.

Figure 2:
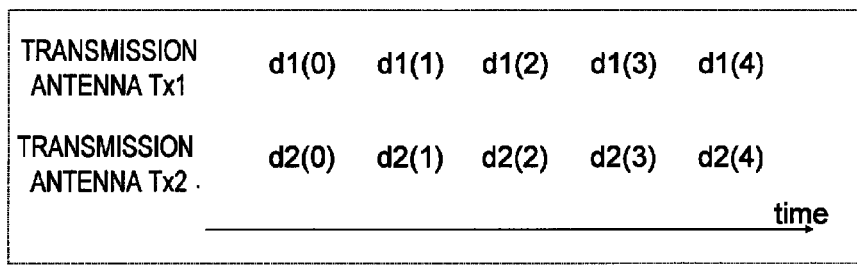
FIG. 2 shows the circumstances of a data series in a case in which the PARC concept explained using

FIG. 2 shows the circumstances of a data series in a case in which the PARC concept explained using FIG. 1 is employed and there are no reception errors, and shows the manner in which data streams are sent as data series under PARC control.

The expression d1($n$) represents the data of symbol n in the stream d1 transmitted from the transmission antenna Tx1. Similarly, the expression d2($n$) represents the data of symbol n in the stream d2 transmitted from the transmission antenna Tx2. If there are no errors, new symbols continue to be transmitted one after another in each of these streams.

Figure 3:
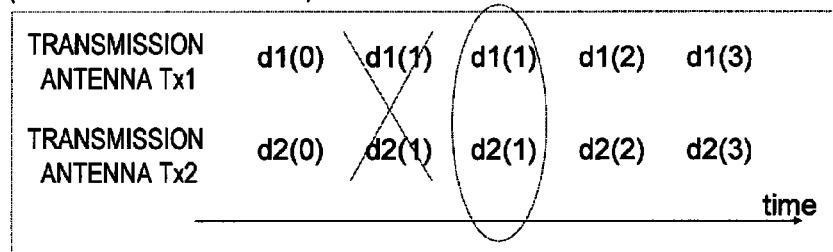
FIG. 3 shows the circumstances of the time series of data when simultaneous errors occur.

FIG. 3 shows the circumstances of the time series of data when simultaneous errors occur; a case is shown in which errors have occurred in all different streams under PARC control, or in which errors have occurred in MIMO multiplexing without performing CRC judgment for each stream.

FIG. 3 shows an example in which the previous frame (d1(1), d2(1)) was erroneous, and so in the next frame the same information is retransmitted.

A SW (Stop and Wait) configuration in which confirmation that the data of the previous frame has arrived before transmitting the next data, or, a GBN (Go Back N) or SR (Selective Repeat) or other method, in which the next data is sent without waiting for confirmation, and retransmission is performed when an error occurs, can be employed.

Also, in order to obtain retransmission gain, the previously described HARQ (Hybrid Automatic Repeat reQuest) can be employed.

Figure 4:
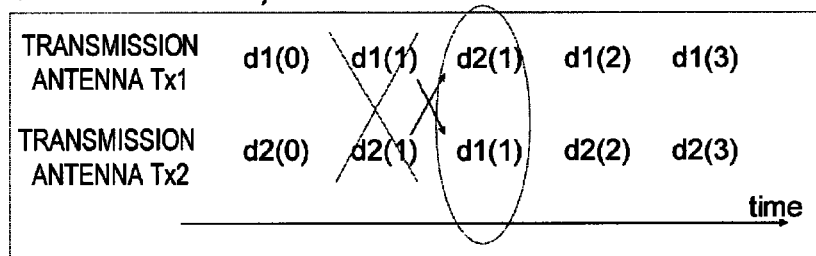
FIG. 4 shows a method is employed in which the streams sent during retransmission in FIG. 3 are interchanged.

In the time series shown in FIG. 4, a method is employed in which the streams sent during retransmission in FIG. 3 are interchanged; this is the example of the prior art described in Patent Reference 1 described above. That is, the data d1(1) transmitted from antenna Tx1 is retransmitted from antenna Tx2, and the data d2(1) transmitted from antenna Tx2 is retransmitted from antenna Tx1. Using this methods, spatial diversity gain can be obtained in retransmission for streams with considerable degradation.

The above has described a case in which errors occur in all different streams under PARC control, or errors occur in MIMO multiplexing in which CRC judgments are not performed for each stream.

In contrast, there is the conventional method in which a stream in which an error has occurred is retransmitted, and new symbols in streams without errors continue to be transmitted one after another.

Figure 5:
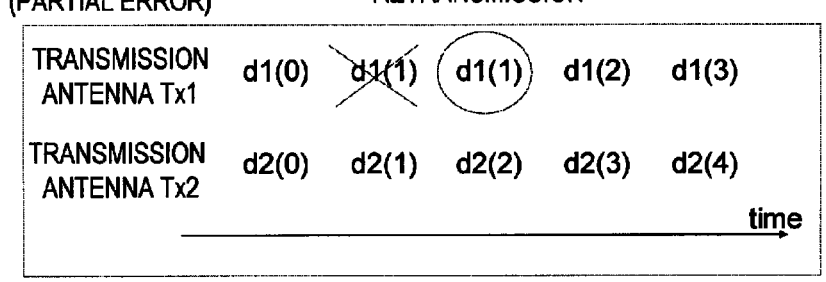
FIG. 5 shows a method of conventional retransmission under circumstances in which an error occurs in a certain stream portion.

That is, FIG. 5 shows a method of conventional retransmission under circumstances in which an error occurs in a certain stream portion, in which the stream d1 in which the error has occurred is retransmitted, and new symbols in a stream d2 in which an error has not occurred continue to be sent one after another.

In these methods of the prior art, when an error again occurs at the time of retransmission, retransmission is repeated, a retransmission delay occurs, and due to this retransmission delay throughput declines when providing multicast broadcasts, television conversations, games, and other services, and there is the problem that the QoS can no longer be ensured.

Hence in this invention, by providing a data retransmission method which results this problem, a method of this invention is a method in which, when retransmitting under circumstances in which an error has occurred in a certain stream portion, symbols of the stream in which the error occurred are transmitted by all the antennas.

Figure 6:
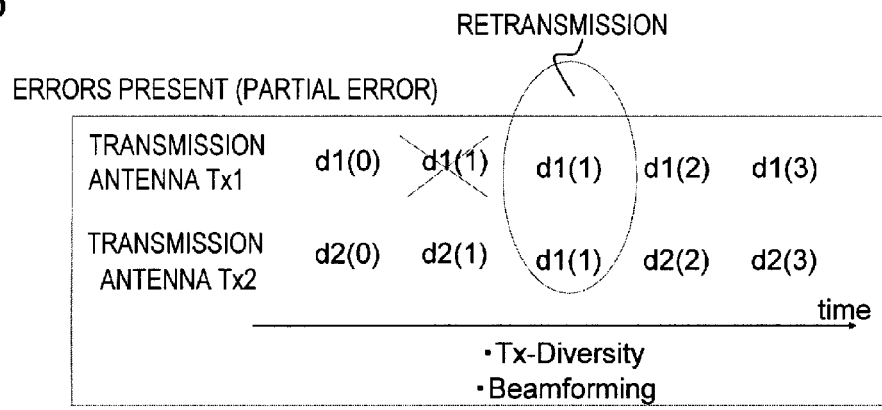
FIG. 6 is a time series diagram showing an example of a data retransmission method according to this invention.

FIG. 6 is a time series diagram showing an example of a data retransmission method according to this invention. In this example, when retransmitting under circumstances in which an error has occurred in a certain portion of the stream d1, the symbols of the stream in which the error occurred are transmitted by all antennas.

That is, in FIG. 6 there are two transmission systems, and when an error has occurred in symbol d1(1) in stream d1 transmitted by the first transmission system, the same symbol d1(1) is transmitted from the transmission antennas Tx1 and Tx2 of the two transmission systems.

In this case, transmission diversity technologies such as STBC (Space Time Block Coding), STFC (Space Time Frequency Coding), CDD (Cyclic Delay Diversity), and similar, that is, space coding diversity in which signal positions are arranged at each time and at each antenna, are applied, or beamforming technology is applied to obtain a gain, so that errors in retransmission can be greatly reduced.

Figure 7:
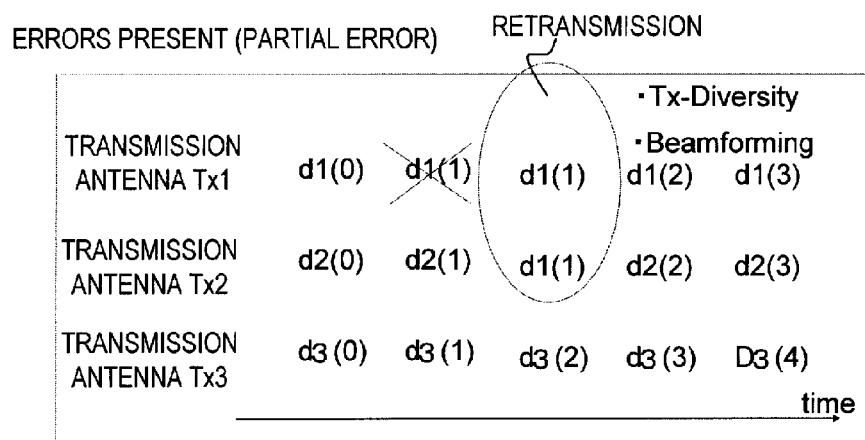
FIG. 7 is a time series diagram showing an example of a retransmission method according to this invention, for a case in which there are a plurality of transmission antennas, greater in number than two.

FIG. 7 is a time series diagram showing an example of a retransmission method according to this invention, for a case in which there are a plurality of transmission antennas, greater in number than two, corresponding to transmission systems greater in number than two.

In FIG. 7, in a case in which an error occurs in symbol d1(1) in a portion of the data stream d1, three transmission antennas Tx1, Tx2, and Tx3 are shown as an example.

In this invention, rather than using all the antennas Tx1, Tx2, Tx3 to retransmit the symbol d1(1) of the stream in which the error occurred, some of the plurality of antennas (for example, antennas Tx1 and Tx2) are used to retransmit the symbol d1(1) of the stream with the error, to reduce errors in retransmission. Using this methods, the necessary retransmission gain is adjusted, and the decline in throughput can be held to a minimum.

Figure 8:
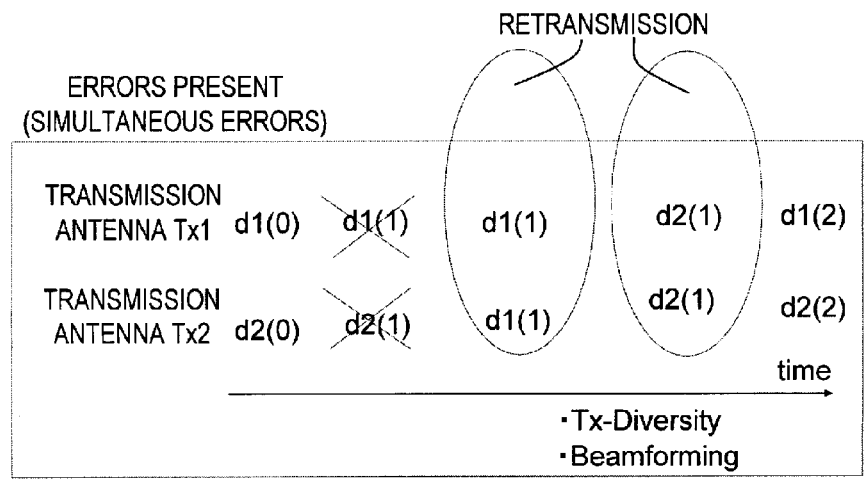
FIG. 8 shows an example of another retransmission method according to this invention.

FIG. 8 shows an example of another retransmission method according to this invention, and is an example in which errors have occurred simultaneously in a plurality of streams d1 and d2.

That is, in FIG. 8, circumstances are shown in which errors have occurred simultaneously at symbols d1(1) and d2(1) in streams d1 and d2. In order to obtain higher gain in retransmission, in this method the symbols d1(1) and d2(1) of the streams with errors are retransmitted using all the antennas Tx1 and Tx2.

That is, because there are a plurality of streams with errors (in the example of FIG. 8, two), retransmission is performed a plurality of times (two times), applying transmission diversity or beamforming.

Figure 9:
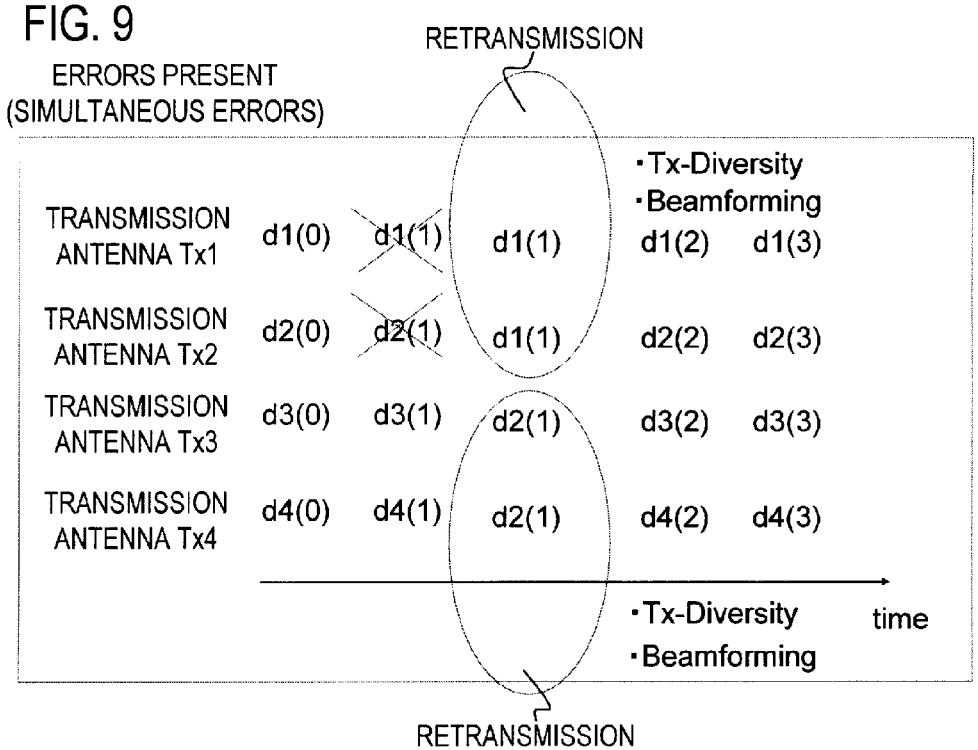
FIG. 9 is an example of extension of the embodiment of FIG. 8.

FIG. 9 is an example of extension of the embodiment of FIG. 8. This is an example of a case in which errors have occurred simultaneously in the symbols d1(1) and d2(1) in the streams d1 and d2 corresponding to the plurality of antennas Tx1 and Tx2, and there exist a plurality of other antennas Tx3 and Tx4 as well.

In the example shown in FIG. 9, transmission diversity or beamforming is applied in retransmission of the symbol d1(1) by the antennas Tx1 and Tx2. At the same time, transmission diversity or beamforming is applied in retransmission of the symbol d2(1) by the plurality of other antennas Tx3 and Tx4.

By this means, errors in retransmitting the symbols with errors d1(1) and d2(1) in the streams d1 and d2 can be reduced.

Figure 10:
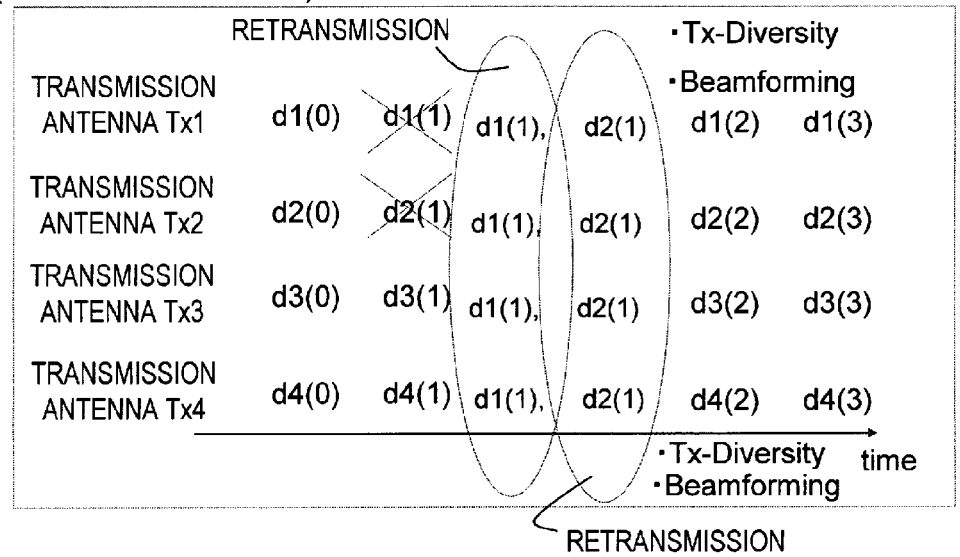
FIG. 10 is a further modified example of FIG. 9; at the time of retransmission, data may be combined in the same slot and transmitted.

FIG. 10 is a further modified example of FIG. 9; at the time of retransmission, data may be combined in the same slot and transmitted.

For example, beamforming is performed using different weights for a plurality of retransmission streams d1(1) and d2(1), and orthogonal space is used in the retransmission. In the case of combination of transmission antennas in FIG. 10, where retransmission beamforming is performed, there must be feedback of the set of weights for the number of retransmission streams.

Next, an example of the configuration of a transmitter and receiver which realize the data retransmission method of this invention described above, as well as operation thereof, are explained.

Figure 11:
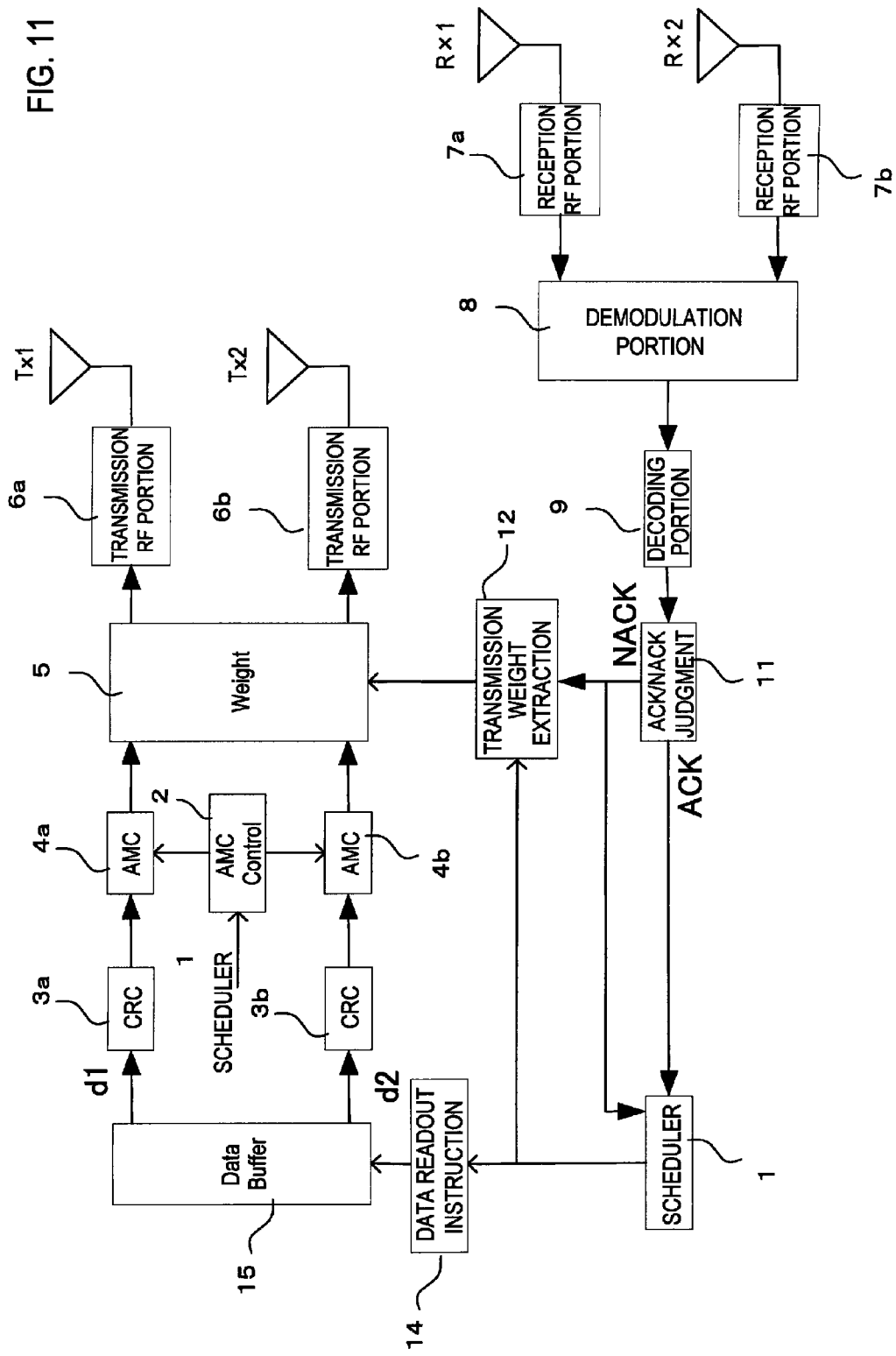
FIG. 11 shows an example of the configuration of a first transmitter according to the invention.

FIG. 11 shows an example of the configuration of a first transmitter according to the invention. In particular, the configuration shown in FIG. 11 is the configuration of a transmitter which uses beamforming in performing retransmission.

First, feedback signals received by the reception antennas Rx1 and Rx2 are converted to the baseband by the reception RF portions 7a and 7b, are demodulated by the demodulation portion 8, and are decoded by the decoding portion 9. Based on the decoding result of the decoding portion 9, the ACK/NACK judgment portion 11 judges whether the previously transmitted symbols were correctly decoded on the receiver side or not.

After decoding is performed correctly on the receiver side, in the case of an ACK response, the scheduler 1 is notified of sending of the next new data. On the other hand, when decoding could not be performed correctly on the receiver side, that is, in the case of a NACK response, the scheduler 1 is notified of retransmission, and at the same time the weight used in retransmission is extracted by a transmission weight extraction portion 12 for each transmission antenna.

When an ACK response is received and ordinary data transmission is performed, the scheduler 1 notifies a data readout instruction portion 14 and the transmission weight extraction portion 12 of the timing and adaptive modulation information for sending the data. As a result, the state of the start of data transmission is entered.

The data readout instruction portion 14 retrieves data accumulated in the data buffer 15 in amounts that can be transmitted in each stream, the error encoding circuits 3a, 3b perform CRC encoding, and the AMC control portion 2 controls the modulation circuits 4a, 4b so as to perform adaptive modulation of each stream conforming to the scheduler 1. Further, the modulated signals are input to the weighting portion 5.

This invention can be implemented whether weights are or are not added, setting the transmission direction, in the weighting portion 5 according to the MIMO multiplexing method. The output of the weighting portion 5 is up-converted by the transmission RF portions 6a, 6b, and is emitted from the antennas Tx1, Tx2.

On the other hand, in data retransmission after receiving a NACK response, when implementing this invention a retransmission instruction is issued from the scheduler 1, and the same data as in the previous transmission and new data for transmission are retrieved from the data buffer 15 by the data readout instruction portion 14.

With respect to this data retrieval, as described in FIG. 6 through FIG. 10 explained above, retrieval is performed for the number of streams transmitted with a certain timing.

Next, the encoding circuits 3a, 3b add a cyclic redundancy check (CRC) to each stream, and through control by the AMC control portion 2 conforming to the scheduler 1, new streams are adaptively modulated by the modulation portions 4a and 4b, and adaptive modulation equivalent to that of the previous transmission is performed on the symbols of retransmission streams. When modulated signals are input to the weighting portion 5, the scheduler 1 instructs use of the weight which has been fed back from the receiver side for a retransmission stream.

With respect to a newly transmitted stream, a weight may or may not be added. Data comprising retransmission streams is up-converted by the transmission RF portions 6a, 6b, and is emitted from the antennas Tx1, Tx2.

Figure 12:
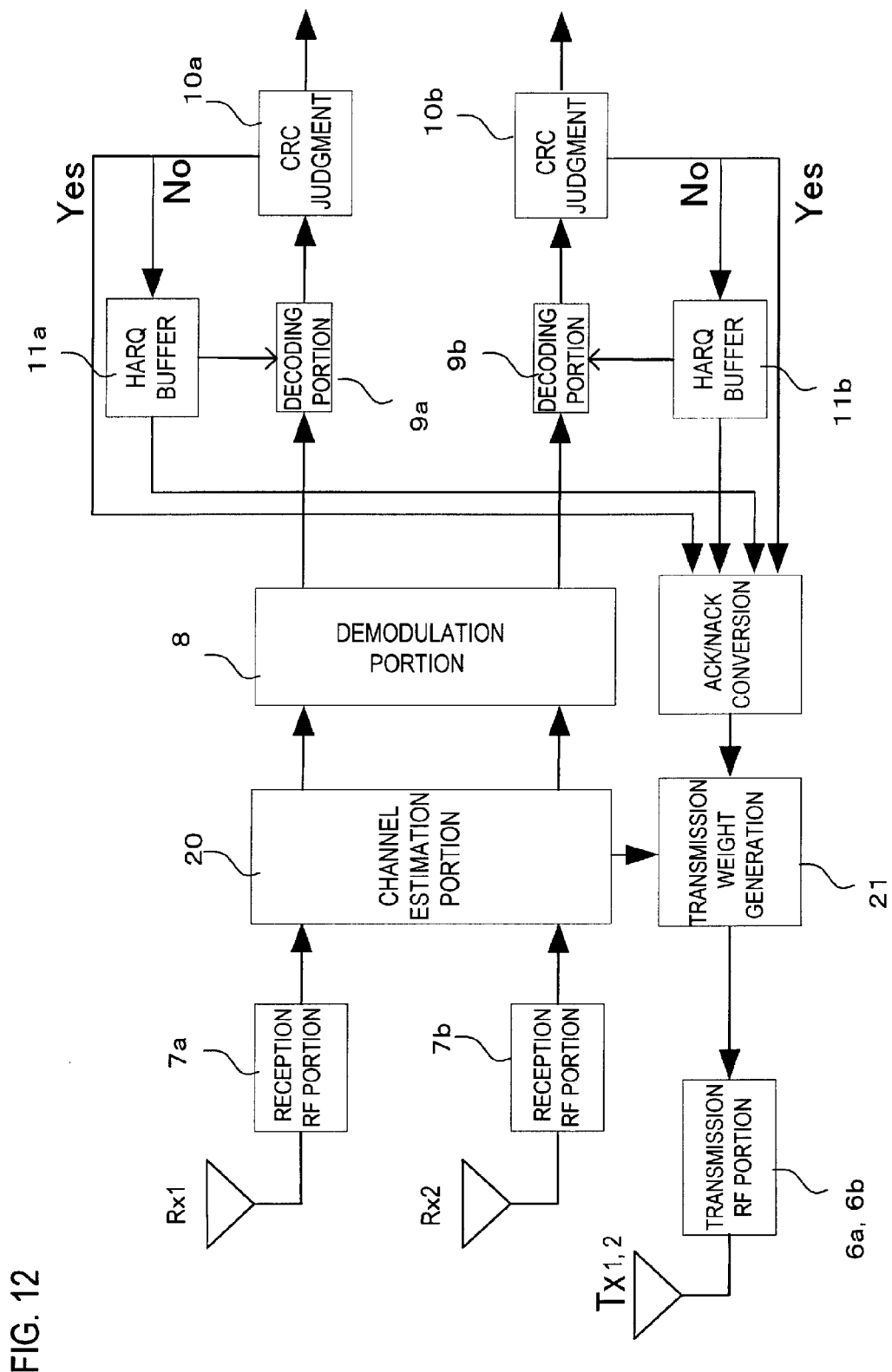
FIG. 12 shows an example of the configuration of a receiver corresponding to the transmitter of FIG. 11.

FIG. 12 shows an example of the configuration of a receiver corresponding to the transmitter of FIG. 11.

First, down-conversion to the baseband is performed by the reception RF portions 7a, 7b, and the channel estimation portion 20 uses the pilot to perform channel estimation. Using this channel estimation value, propagation path compensation is performed, the modulated wave is demodulated by the demodulation portion 8, and data decoding is performed by the decoding portions 9a, 9b.

In demodulation and decoding, the transmitter side notifies the receiver of the adaptive modulation format using a well-known method. Decoded data is subjected to CRC judgment by the CRC judgment portions 10a, 10b as error checking, and if there are no errors, (Yes) output is generated, but if there are errors (No) output is generated.

When there is (No) output, data prior to decoding is stored in the HARQ buffers 11a, 11b, and a NACK response is generated by the ACK/NACK conversion portion 22.

Here, when there is a NACK response, a transmission weight suitable for retransmission is calculated by the transmission weight generation portion 21 from the channel estimation result by the channel estimation portion 20.

And, in addition to ACK/NACK, the weight information calculated by the transmission weight generation portion 21 is included, and the control information up-converted by the transmission RF portions 6a, 6b and is fed back to the transmitting side.

Here, the transmission weight calculated by the transmission weight generation portion 21 is used to calculate the space for maximum transmission of energy, using for example the following equation.

That is, let the channel estimation values when transmission is by M antennas and reception is by N antennas form a matrix H (of N rows by M columns).

This matrix H is decomposed into a unitary matrix and a diagonal matrix using the SVD (Singular Value Decomposition) algorithm as follows.

$$H = U\Sigma V^H \quad (1)$$

Here U is a unitary matrix (with N rows by N columns), $\Sigma$ is a matrix (with N rows by M columns) having positive singular values ($\lambda_1 \lambda_2 \ldots \lambda_M$) in diagonal elements, and $V^H$ is a unitary matrix (with M rows by M columns).

The square of the positive values of the diagonal elements represent the radio propagation energy, and so the gain is maximized by performing beamforming toward the space ($\lambda_i$) in which the singular values are greatest.

Here, the transmission weight vector is represented by $W_{tx}$, and the reception weight vector by $W^H_{rx}$. Because of energy normalization, the magnitudes of the elements of the vectors are the same, and moreover the following conditions apply.

$$W^H_{tx} W_{tx} = 1, W^H_{rx} W_{rx} = 1 \quad (2)$$

The propagation path, including weights, is represented as follows.

$$h' = W^H_{rx} U \Sigma V^H W_{tx} \quad (3)$$

The space of the ith $\lambda_i$ of the matrix $\Sigma$ is to be used, and so the vector $W^H_{rx}$ (i) which pattern-cancels the ith column vector of the matrix U, and the vector $W_{tx}$(i) which pattern-cancels the ith row vector of the matrix $V^H$, are determined.

Using these weights, $\lambda_i$ can be extracted as follows.

$$W^H_{rx}(i) U \Sigma V^H W_{tx}(i) \quad (4)$$

The above calculation is as described in J. B. Andersen, "Array gain and capacity for known random channels with multiple element arrays at both ends", IEEE Jour. Selec. Areas Commun., 18, 11, pp. 2172-2178 (2000); if necessary, frequency intervals with prescribed periods can be used, executing control such that energy propagation can be maximized.

Figure 13:
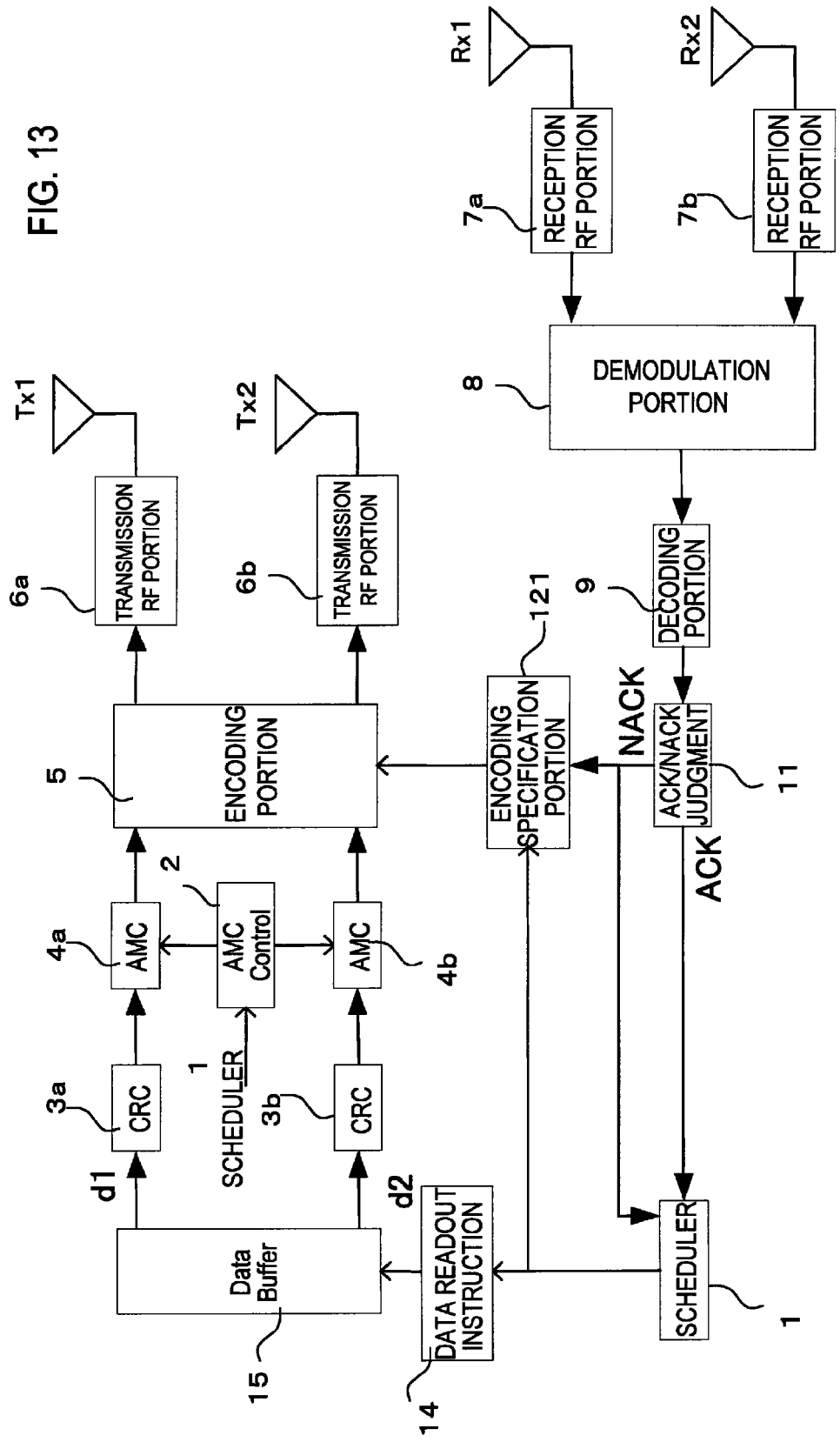
FIG. 13 shows the configuration of the transmitter shown in FIG. 11, having further features.

FIG. 13 shows the configuration of the transmitter shown in FIG. 11, having further features.

That is, in this configuration the transmission weight extraction portion 12 in FIG. 11 is replaced with an encoding specification portion 121.

When a NACK judgment has been given for previously transmitted symbols. the scheduler 1 is notified, a retransmission instruction is issued from the scheduler 1, and at the data readout instruction portion 14 the same data as before and new data for transmission are retrieved. Here, the scheduler 1 specifies to the encoding specification portion 121 the place in the stream for retransmission, and predetermined encoding is performed.

Figure 14:
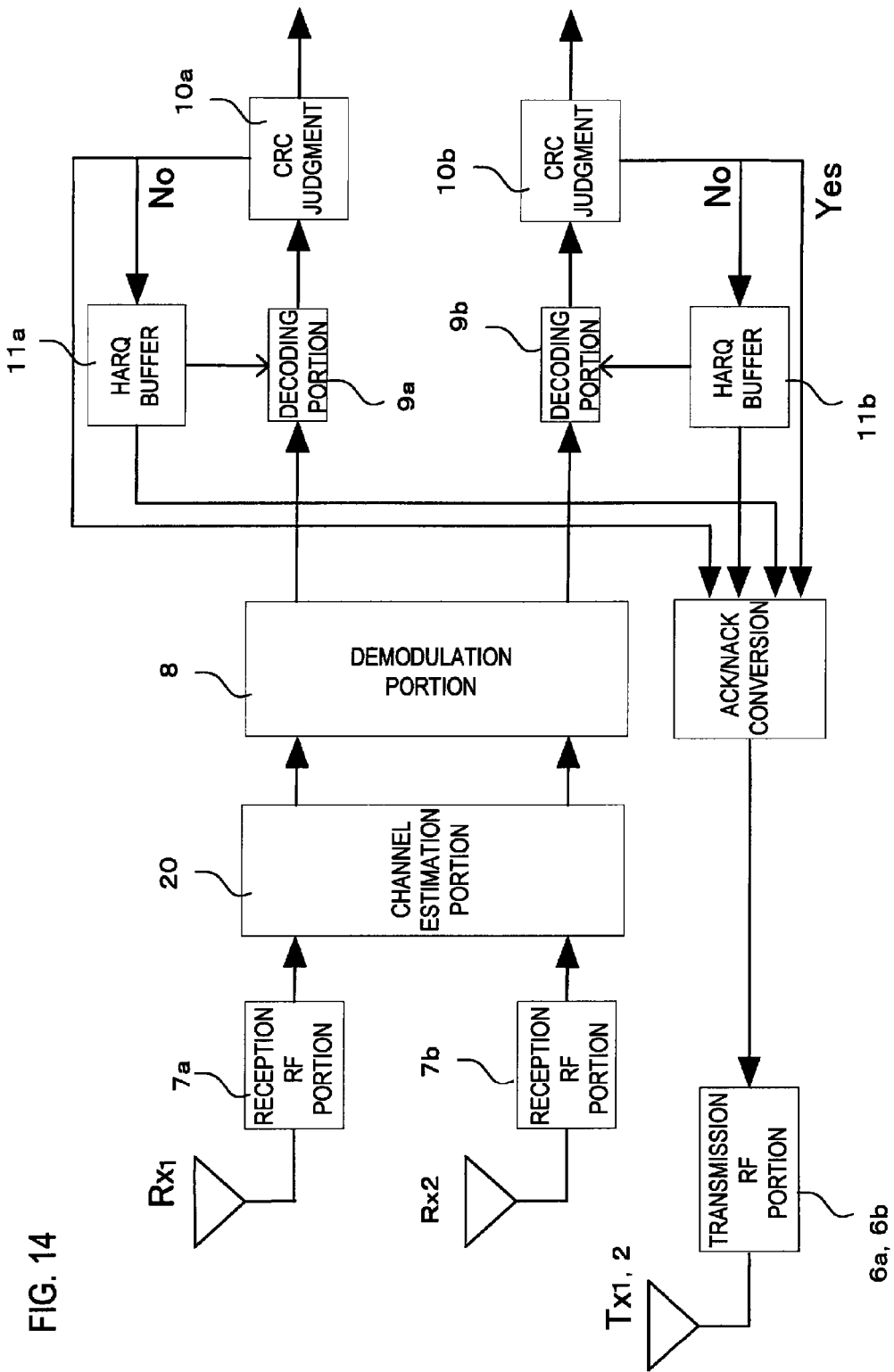
FIG. 14 shows an example of the configuration of a receiver corresponding to the transmitter configuration of FIG. 13.

FIG. 14 shows an example of the configuration of a receiver corresponding to the transmitter configuration of FIG. 13.

A change in FIG. 14 compared with the receiver configuration in FIG. 12 is the fact that there is no control signal for the transmission weight extraction portion 12 from an estimation value from the channel estimation portion 20.

By employing open-loop control, there are the advantages that control information feedback is reduced and reverse-link throughput characteristics are not degraded.

STBC, SFBC, CDD, or similar are conceivable as the encoded transmission used here. SFBC is an extension of STBC.

STBC is described for example in S. Vahid Tarokh et al, "Space-Time Block Codes from Orthogonal Designs", IEEE Trans. on Info. Theory, vol. 45 no. 5, July 1999. And, CDD is described for example in A. Huebner et al, "A Simple Space-Frequency Coding Scheme with Cyclic Delay Diversity for OFDM", 2003.

Figure 15:
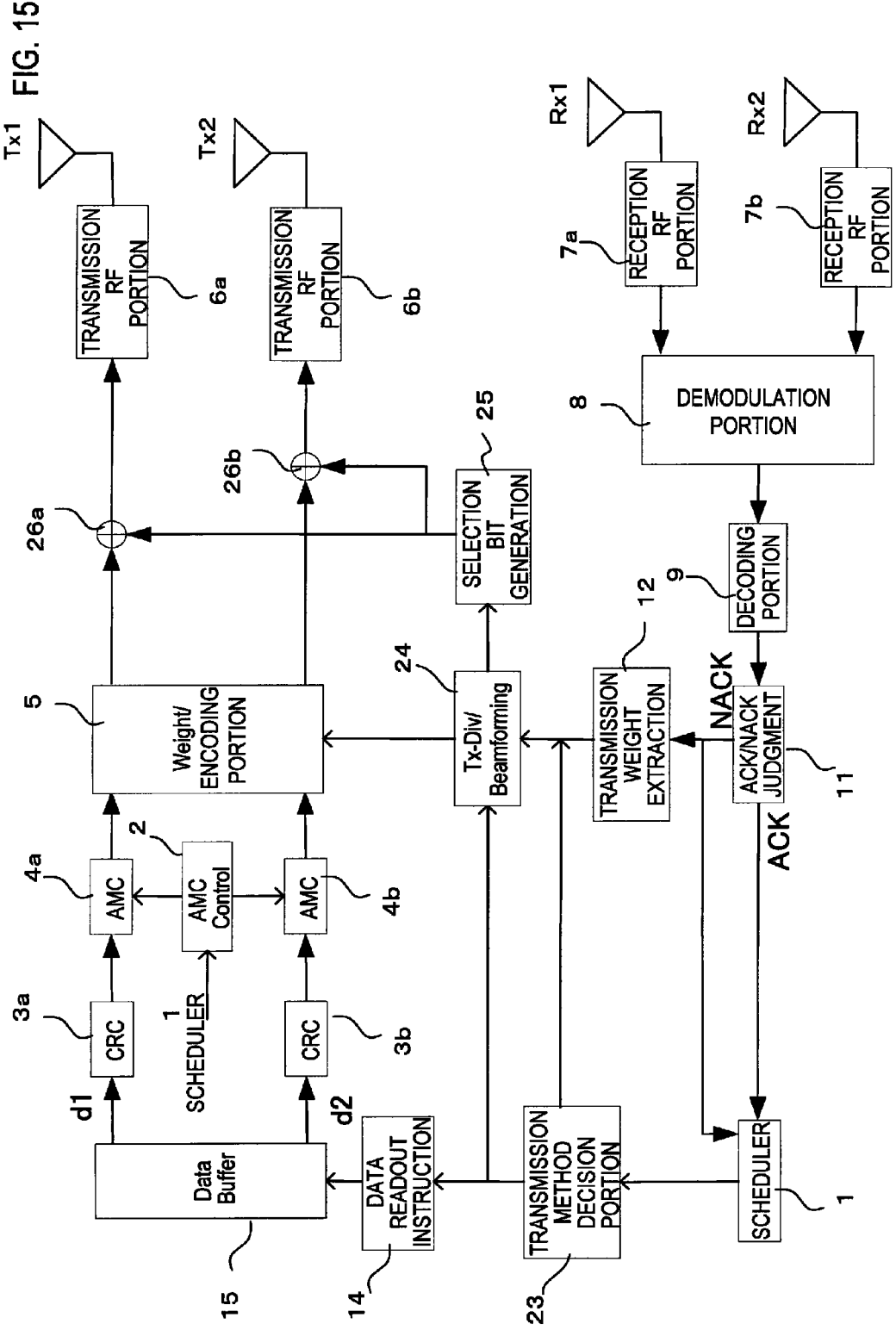
FIG. 15 shows an example of further extension of the transmitter configurations of FIG. 11 and FIG. 13.

FIG. 15 shows an example of further extension of the transmitter configurations of FIG. 11 and FIG. 13. A major feature is the presence of a transmission method decision portion 23. In this configuration, by means of this transmission method decision portion 23 it is possible to choose between use of transmission diversity and use of beamforming for retransmission.

Also, when on the receiver side it is not possible to judge which has been selected, a transmission diversity/beamforming specification portion 24 makes a specification corresponding to the retransmission mode decided by the transmission method decision portion 23, and a selection bit generated by a selection bit generation portion 25 corresponding to the specified transmission method is added as a control signal by addition circuits 26a, 26b to notify the receiving side.

After all the previously transmitted symbols is judged as ACK, the specification portion 24 does not specify transmission diversity or beamforming, and in the selection bit generation portion 25 also a selection bit is not generated, and DTX (Discontinuous Transmission) transmission is performed.

On the transmitter side, because beamforming operates under closed-loop control, the judgment of whether to perform beamforming transmission or to use transmission diversity is made based for example on whether fading fluctuations are being followed.

Figure 16:
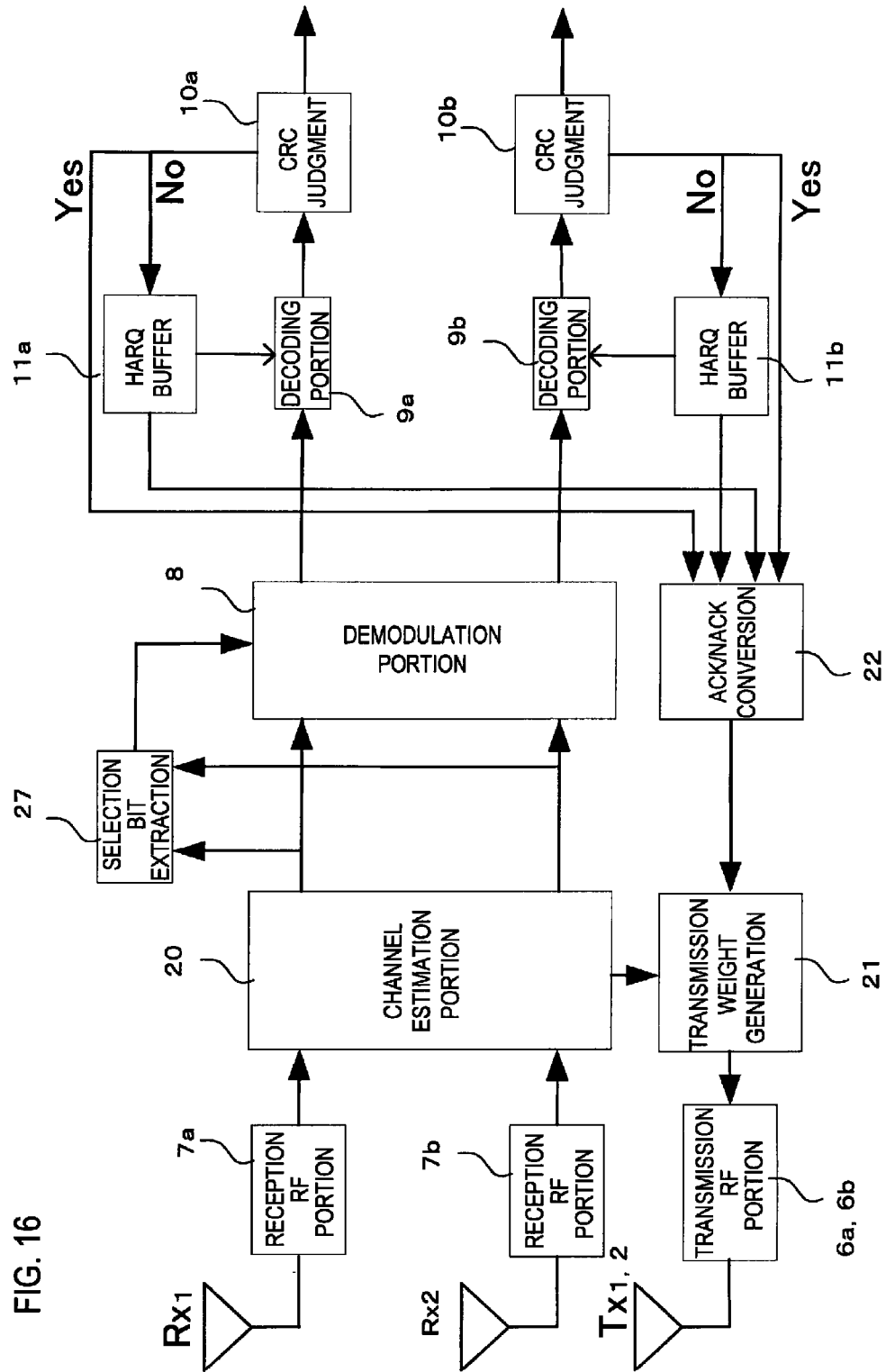
FIG. 16 is a receiving configuration corresponding to FIG. 15.

FIG. 16 is a receiving configuration corresponding to FIG. 15, and has functions which are further extensions with respect to FIG. 12 and FIG. 14.

A major feature is the adaptive application of transmission diversity or beamforming by the transmission method decision portion 23 during retransmission by the transmitter, as explained above using FIG. 15. Hence on the receiver side, in the selection bit extraction portion 27 after channel estimation by the channel estimation portion 20, the selection bit which was generated by the selection bit generation portion 25 and inserted by the addition circuits 26a, 26b on the transmission side is extracted.

Then, in the demodulation portion 8 and the decoding portions 9a, 9b, data demodulation is performed, similarly to the embodiments explained above, according to the modulation method corresponding to the extracted selection bit.

FIG. 17 shows an example of a frame format configuration used when performing adaptive modulation using the scheduler 1, for the transmitter and receiver configurations explained above.

The pilot channel A, scheduler management channel B, and data channel are arranged in the time axis direction, and these respective channels are also multiplexed in the frequency axis direction.

Transmission over the pilot channel A is performed, propagation path fluctuation is estimated, and this is used to decipher information in the scheduler management channel B and read the written user allocation information and adaptive modulation information; using this propagation path estimation value and adaptive modulation information, a data channel addressed to the terminal itself is decoded.

As explained in FIG. 15 and FIG. 16, when switching between transmission encoding diversity and beamforming, the receiving side must know the transmission method used prior to demodulation. For this reason a selection bit D is used, inserting this into a portion of the scheduler management channel B and transmitting to the receiver side, as shown in FIG. 18.

On the receiver side, the selection bit D information is judged when decoding the scheduler management channel, and by deciding the decoding method of the data channel sent next, data channel decoding is made possible.

Figure 19:
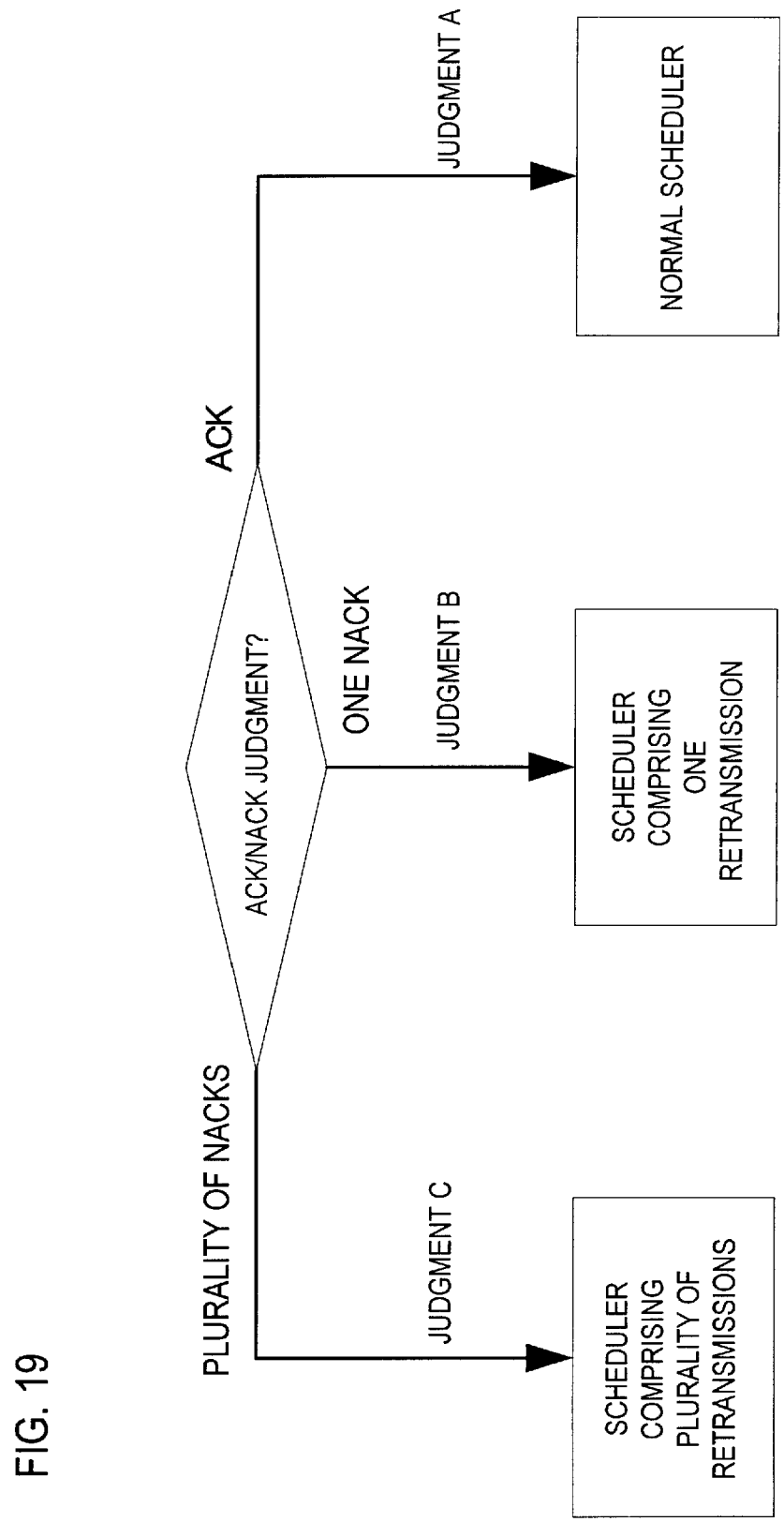
FIG. 19 is a flow diagram showing the processing procedure of the scheduler in the above receiver configuration example, and shows the flow of selecting a transmitter-side antenna.

FIG. 19 is a flow diagram showing the processing procedure of the scheduler 1 in the above receiver configuration example, and shows the flow of selecting a transmitter-side antenna.

In FIG. 19, based on the judgment result of the ACK/NACK judgment portion 11, the scheduler to be used is decided.

That is, in ACK/NACK judgment, when the result is ACK (judgment A) the normal scheduler is selected, but when the result is NACK for one stream, the scheduler comprising one retransmission (judgment B) is selected, and when the result is NACK for a plurality of streams (judgment C), the scheduler comprising a plurality of retransmissions is selected.

Figure 20:
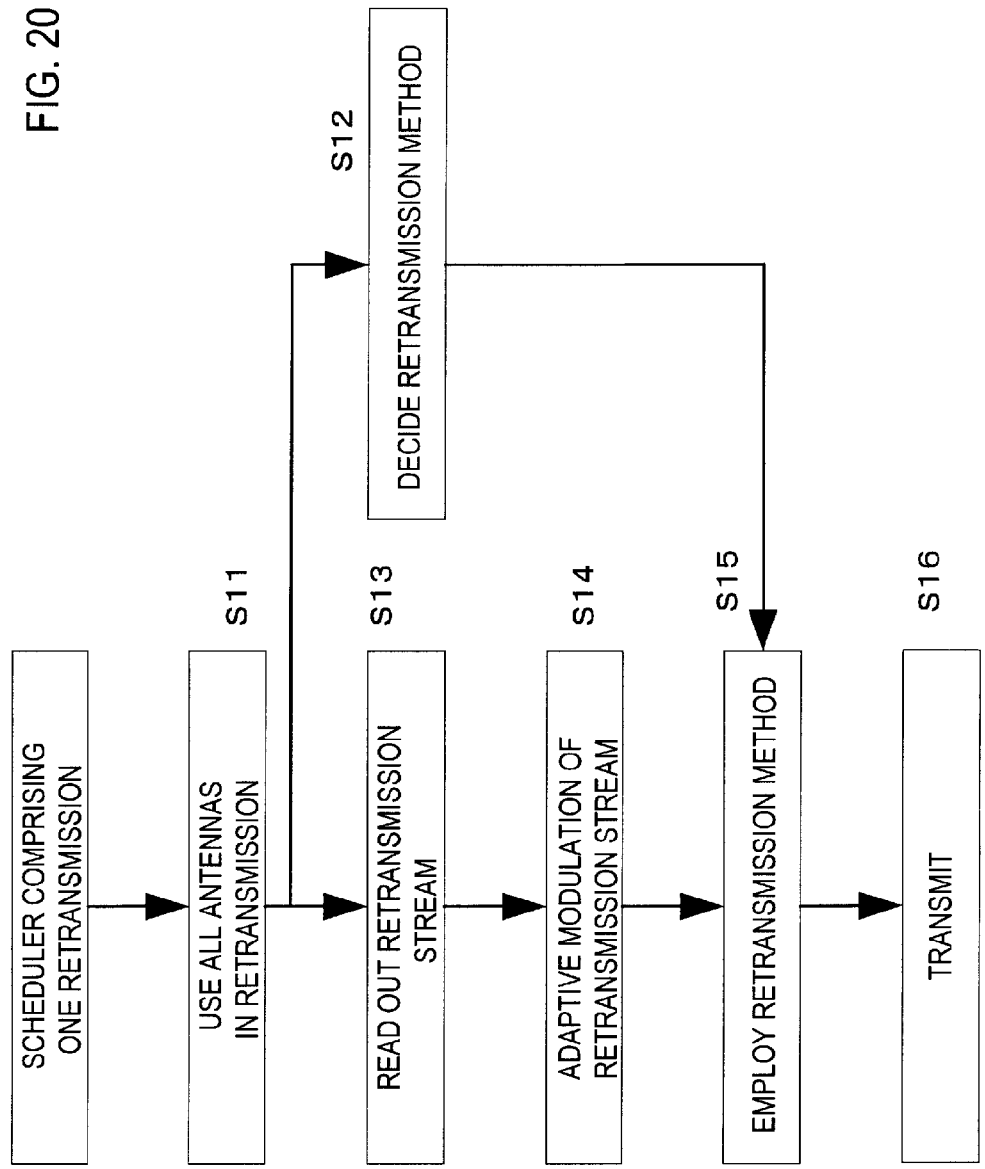
FIG. 20 shows the flow of scheduler operation to realize the configuration of FIG. 6, for the case of retransmission data for one stream.

FIG. 20 shows the flow of scheduler operation to realize the configuration of FIG. 6, for the case of retransmission data for one stream in the above judgment.

In this case, all antennas are used in retransmission (step S11). In parallel with operation to decide the retransmission method (step S12), readout from the retransmission stream data buffer 15 is performed (step S13). The read-out retransmission stream is subjected to the same adaptive modulation performed previously on the transmitted data (step S14).

Then, having been subjected to adaptive modulation, the retransmission stream is transmitted according to the previously decided transmission method, either transmission diversity or beamforming.

Figure 21:
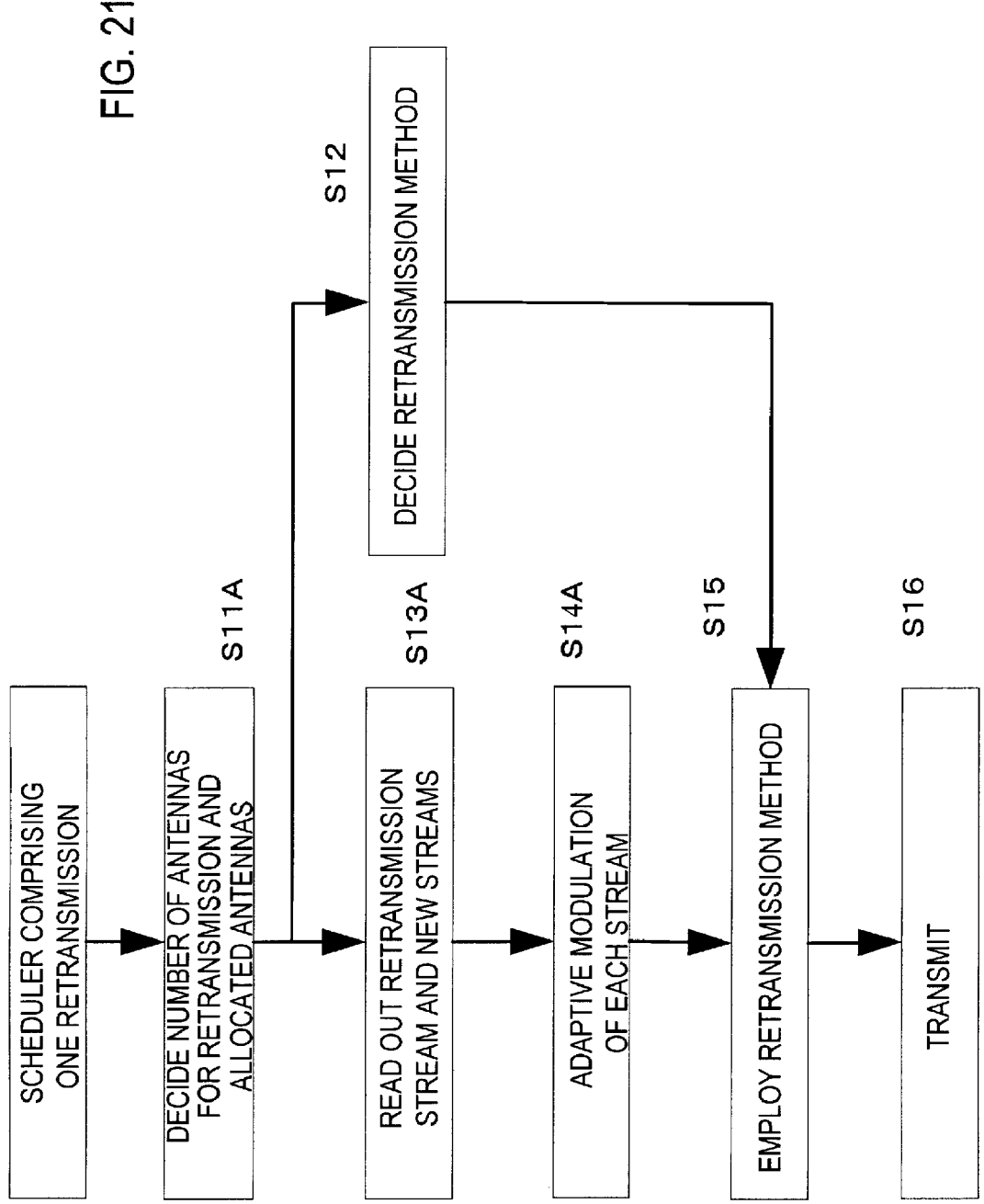
FIG. 21 shows the flow of scheduler operation to realize the configuration of FIG. 7, for the case in which the retransmission data comprises one stream.

FIG. 21 shows the flow of scheduler operation to realize the configuration of FIG. 7, for the case in which the retransmission data comprises one stream.

In this case, the number of antennas used in retransmission and the allocated antennas are decided (step S11A). In parallel with operation to decide the retransmission method (step S12), reading of the retransmission stream and a new stream from the data buffer 15 is performed (step S13A).

The read-out retransmission stream is subjected to the same adaptive modulation performed previously on the transmitted data, and adaptive modulation of the new stream is also performed (step S14A).

Then, having been subjected to adaptive modulation, the previously decided transmission method is employed for the retransmission stream (step S15), which is transmitted (step S16).

Figure 22:
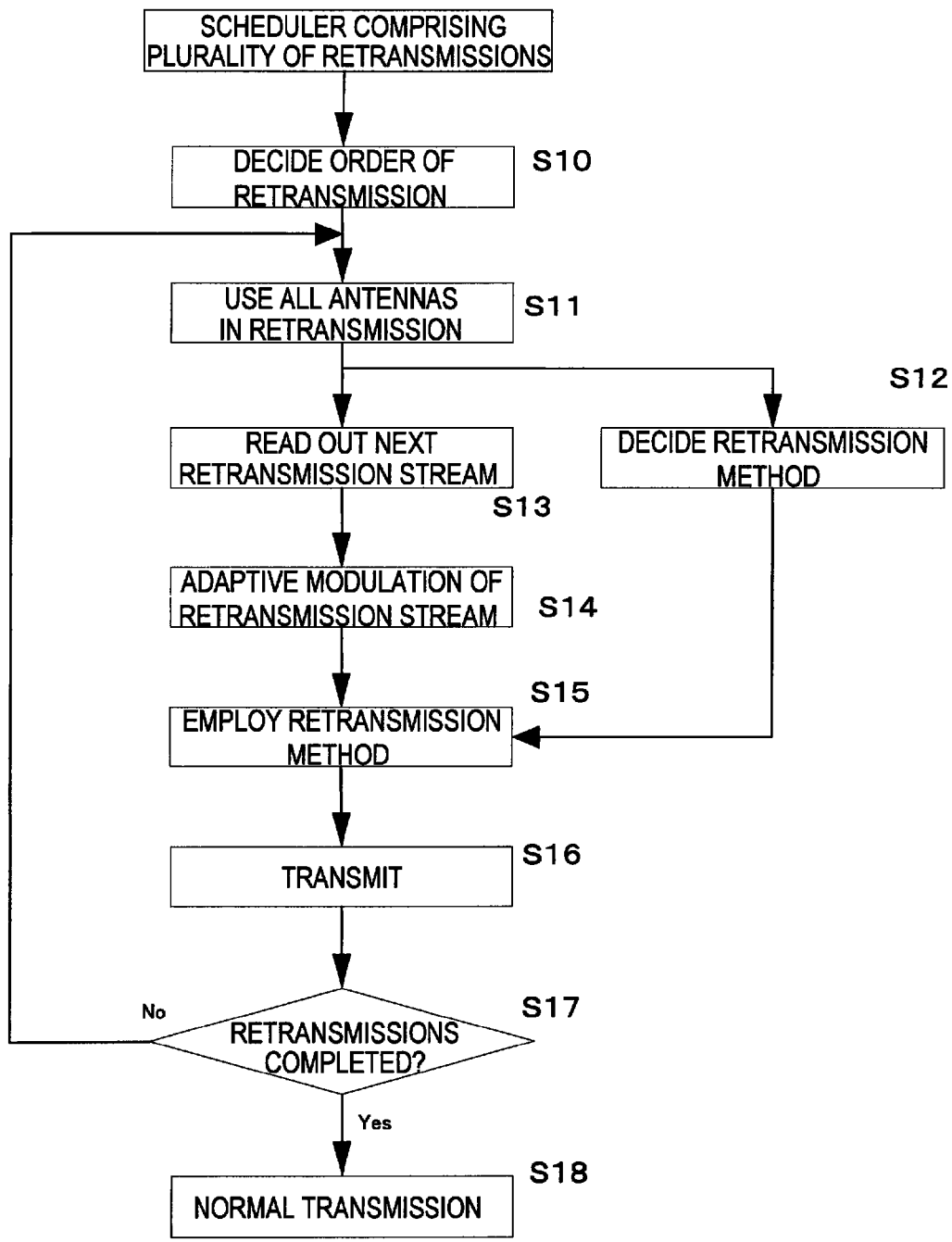
FIG. 22 shows the flow of scheduler operation to realize the configuration of FIG. 8, for example, for a case comprising a plurality of retransmission streams.

FIG. 22 shows the flow of scheduler operation to realize the configuration of FIG. 8, for example, for a case comprising a plurality of retransmission streams.

First, the order of the plurality of retransmission streams is decided (step S10).

Settings are made such that all the antennas are used in retransmission (step S11).

In parallel with operation to decide the retransmission method (step S12), readout of the retransmission streams from the data buffer 15 is performed (step S13). The read-out retransmission streams are subjected to the same adaptive modulation performed previously on the transmitted data (step S14).

Then, having been subjected to adaptive modulation, the previously decided transmission diversity or beamforming transmission method is employed for the retransmission streams (step S15), which are transmitted (step S16).

The above processing is performed until the above-decided transmission stream order is completed (Yes in step S17), and upon completion, there is a transition to normal transmission (step S18).

Figure 23:
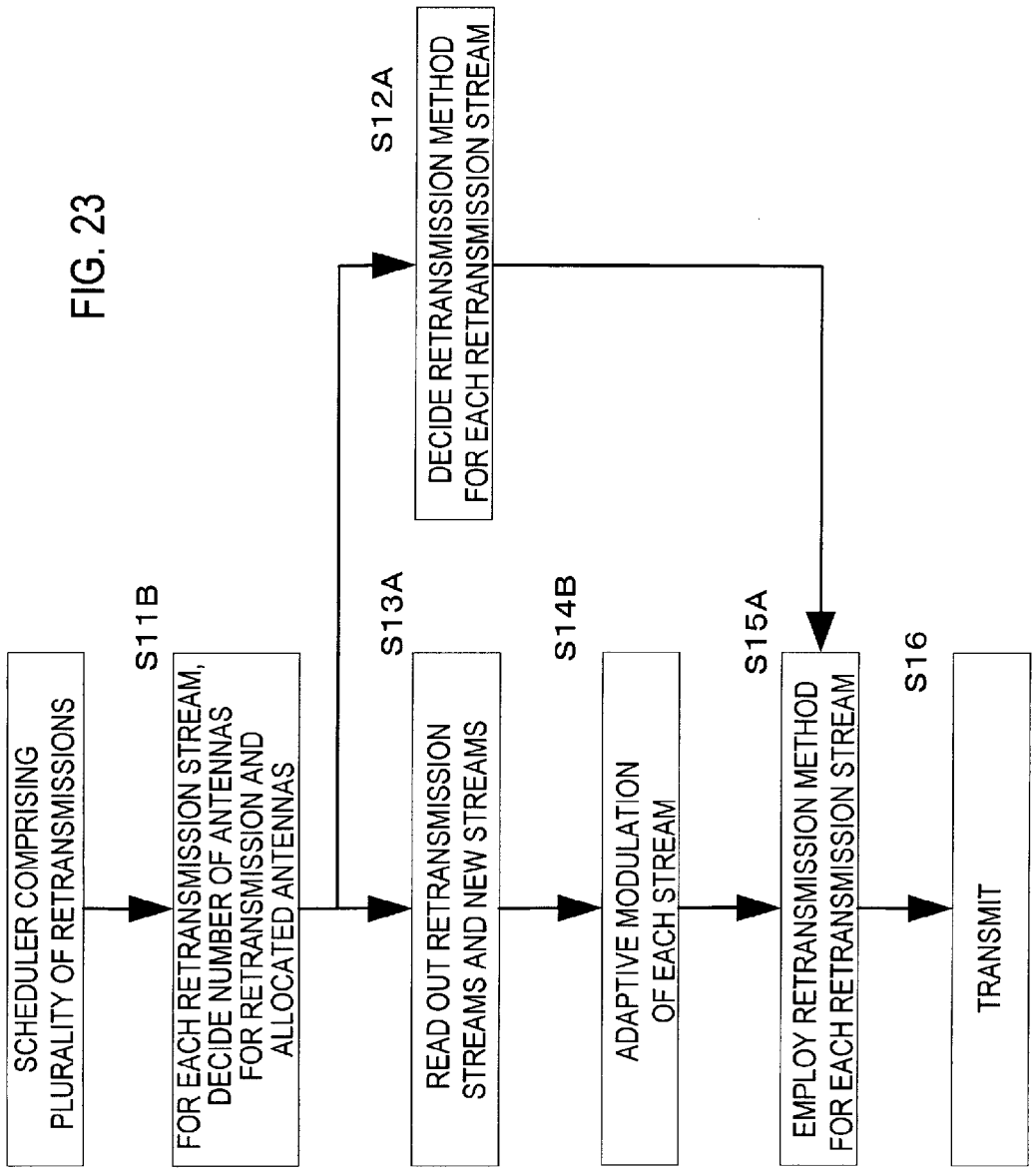
FIG. 23 shows the flow of scheduler operation to realize the configuration of FIG. 9 and FIG. 10, for example, for a case comprising a plurality of retransmission streams.

FIG. 23 shows the flow of scheduler operation to realize the configuration of FIG. 9 and FIG. 10, for example, for a case comprising a plurality of retransmission streams.

For each retransmission stream, the number of retransmission antennas and the allocated antennas are decided (step S11B). Applied to the configuration of FIG. 9, a decision is made to allocate two transmission antennas Tx1 and Tx2 to stream d1, and two transmission antennas Tx3 and Tx4 to stream d2.

Readout of the retransmission streams and the new streams is performed (step S13A), and at the same time the retransmission method is decided for each retransmission stream (step S12A). Adaptive modulation of each stream is performed (step S14B), and then the retransmission method previously decided corresponding to a retransmission stream is applied to the retransmission stream (step S15A), which is transmitted (step S16).

Next, an example of an algorithm for selection criterion conditions is explained below, for cases in which coding diversity and beamforming can be adaptively selected as the previously explained transmission methods.

(1) Fading Speed Relative to Retransmission Period

Figure 24:
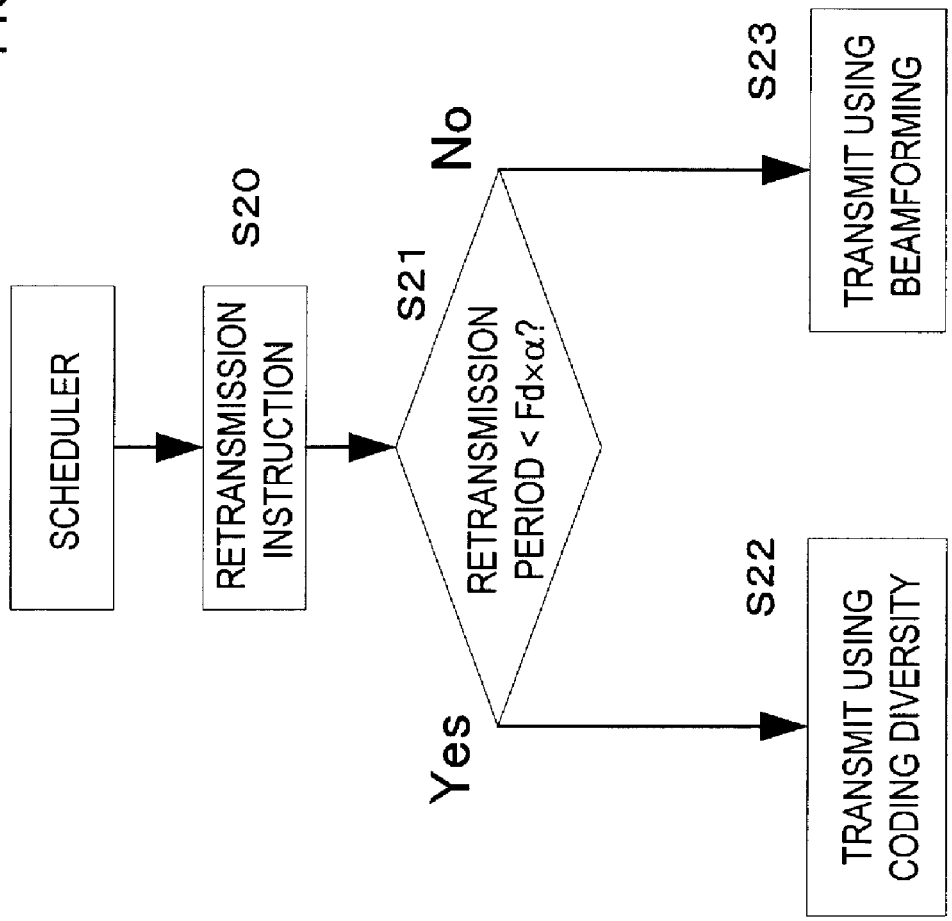
FIG. 24 shows the flow of transmission method selection/judgment for a retransmission period, using as a criterion the fading speed.

FIG. 24 shows the flow of transmission method selection/judgment for a retransmission period, using as a criterion the fading speed.

When a retransmission instruction is issued by the scheduler 1 (step S20), the retransmission period, which is the difference between the time at which data was first sent and the retransmission time, and the fading speed Fd determined from the channel estimation value, are used to perform selection/judgment as to whether coding diversity or beamforming should be used as the retransmission method (step S21).

The fading speed Fd is multiplied by an appropriate parameter $\alpha$ to set an appropriate threshold value.

That is, when the retransmission period Fd is smaller than a prescribed fading speed Fd (=Fd×$\alpha$), the coding diversity transmission method is selected (step S22). Conversely, when the retransmission period Fd is larger than the prescribed fading speed Fd (=Fd×$\alpha$), the beamforming transmission method is selected (step S23).

An important point in this judgment method is that, when data is initially sent, the pilot channel is used to generate a propagation path estimation and beamforming weight, and the fading speed Fd is used to judge whether at the time of retransmission the propagation path has greatly changed. And, when the propagation path has not greatly changed, beamforming is employed.

With respect to the fading speed Fd, a method used in the prior art may be employed. With respect to $\alpha$, the optimum value determined in computer simulations or similar may be employed.

(2) Judgment Using (Squares of Maximum Values of Eigenvalues) and (Square of the Sum of Eigenvalues)

Figure 25:
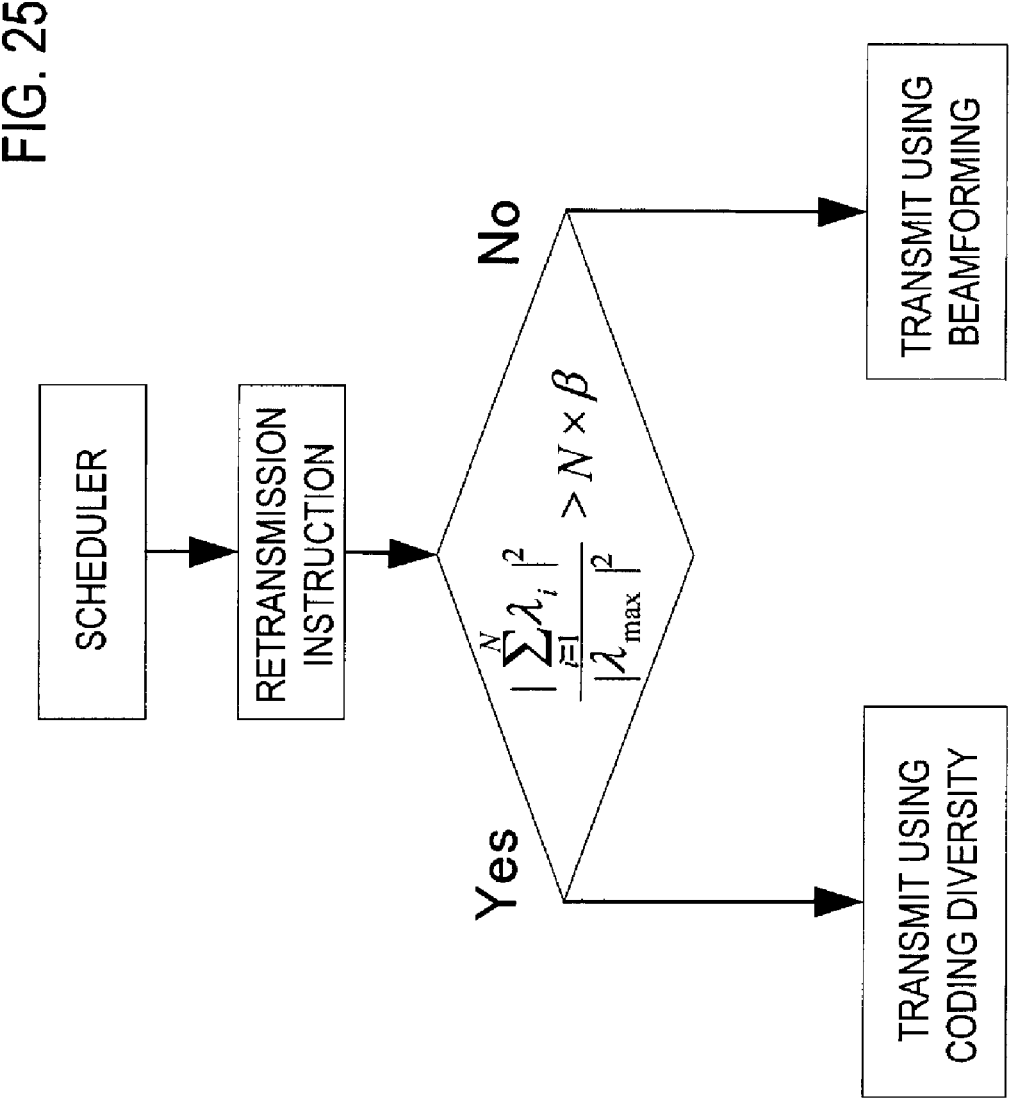
FIG. 25 shows a second transmission method selection/judgment flow for a retransmission period, using as a criterion the fading speed.

FIG. 25 shows a second transmission method selection/judgment flow for a retransmission period, using as a criterion the fading speed. In FIG. 25, when a retransmission instruction is output from the scheduler (step S20), the eigenvalue of the channel correlation matrix is used to calculate the diversity dimension, and depending on how large this is compared with the correlation matrix maximum rank N (step S21A), the retransmission method is selected as using coding diversity or using beamforming.

With respect to the channel matrix, the channel estimation value H to receive feedback signals over a feedback link is employed to determine the channel correlation matrix $S=HH^H$. Through eigenvalue expansion of this matrix, a diagonal matrix D having the eigenvalues can be extracted.

$$S = HH^H = ADA^H \quad [E1]$$

$$D = \begin{bmatrix} \lambda_1 & 0 & \ldots & 0 \\ 0 & \lambda_2 & \ldots & 0 \\ \ldots & \ldots & \ldots & \ldots \\ 0 & 0 & \ldots & \lambda_N \end{bmatrix}$$

The eigenvalues of the correlation matrix S are positive integers, and so the maximum value is selected as follows.

$$\lambda_{max} = \arg\max[\lambda_1, \lambda_2, \ldots, \lambda_N] \quad [E2]$$

An important point of this judgment method is the fact that the eigenvalues of the correlation matrix S and the maximum value thereof are used to evaluate energy variation in the eigenspace of the propagation path, and if there is a certain amount of variation, use of coding diversity is selected.

With respect to $\beta$, values are between 0 and 1.0, and an appropriate value optimized in computer simulations may be used.

This eigenvalue analysis is described in detail in Simon Haykin, "Adaptive Filter Theory 4th Edit".

(3) Judgment Using the Feedback Link SIR

FIG. 26 shows a third transmission method selection/judgment flow for a retransmission period, using as a criterion the fading speed. When a retransmission instruction is output from the scheduler (step S20), the SIR obtained by employing the channel estimation value used to receive feedback signals over the feedback link is used to select the retransmission method as using coding diversity or using beamforming.

An important point of this method is that the feedback link SIR is compared with an appropriate threshold value TH (step S21bn), and if the SIR of the weight information used in transmission is higher than the threshold value TH and is reliable, beamforming is used (Yes in step S21B).

With respect to the threshold value TH, an appropriate value optimized in computer simulations may be used.

INDUSTRIAL APPLICABILITY

By means of the above-described invention, the reoccurrence of errors in retransmission can be prevented, and QoS (Quality of Service) can be ensured for services multicast broadcasts, television conversations, games). Hence through application of this invention, a high-throughput data retransmission method and a mobile communication system employing this method can be provided, and can contribute greatly to industry.

The invention claimed is:

1. A data retransmission method for a radio communication system, in which a plurality of data streams are transmitted from a plurality of transmission systems, the method comprising:
   when there is a transmission error in transmission data in any of the plurality of data streams, adaptively selecting beamforming or spatial coding for retransmission of the transmission data; and
   retransmitting the transmission data with transmission errors by using either of selected beamforming or spatial coding,
      wherein a criterion for adaptively selecting the beamforming or spatial coding is that by comparing a retransmission period with a prescribed fading speed, the beamforming is selected when the retransmission period is not smaller than the prescribed fading speed, while the spatial coding is selected when the retransmission period is smaller than the prescribed fading speed.

2. The data retransmission method according to claim 1, further comprising:
   when there is a transmission error in each of the transmission data of at least two data streams among the plurality of data streams, deciding the order of retransmission of the transmission data with the transmission errors for the at least two data streams; and
   retransmitting the transmission data with the transmission errors, in the decided order, in use of two or more of the transmission systems.

3. The data retransmission method according to claim 1, further comprising:
when there is a transmission error in each of the transmission data of at least two data streams among the plurality of data streams, retransmitting the transmission data with the transmission errors simultaneously from at least two transmission systems of the plurality of data streams, respectively corresponding to the transmission data with the transmission errors.

4. A data retransmission method for a radio communication system, in which a plurality of data streams are transmitted from a plurality of transmission systems, the method comprising:
when there is a transmission error in transmission data in any of the plurality of data streams, adaptively selecting beamforming or spatial coding for retransmission of the transmission data; and
retransmitting the transmission data with transmission errors by using either of selected beamforming or spatial coding,
wherein a criterion for the adaptive selection of the beamforming or spatial coding is that by calculating a diversity dimension in use of eigenvalues of a channel correlation matrix and comparing the calculated diversity dimension with a correlation matrix maximum rank N, the beamforming is selected when the calculated diversity dimension has a prescribed magnitude with respect to the correlation matrix maximum rank N, while the spatial coding is selected when the calculated diversity dimension does not have the prescribed magnitude.

5. A radio communication system having a plurality of transmission systems, each of the plurality of transmission systems comprising:
a modulator for which a modulation method is adaptively selected and controlled;
a radio transmission portion to convert the output of the modulator to a radio frequency; and
a scheduler to control the modulator so as to perform adaptive modulation according to a propagation path quality, wherein
when there is a transmission error in the transmission data in any of the plurality of data streams transmitted by the plurality of transmission systems, the scheduler controls to read out data from a data buffer so that the transmission data with the transmission error is retransmitted simultaneously in use of at least two transmission systems of the plurality of data streams; and further controls the modulator to perform for the data to be retransmitted, modulation that is the same as the adaptive modulation used in the previous transmission.

6. The radio communication system according to claim 5, further comprising a weighting portion in each of the plurality of transmission systems between the modulator and radio transmission portion, wherein the scheduler controls weights with timing to transmit at least the retransmission data corresponding to transmission weights received in notification by the weighting portion from the receiving side.

7. The radio communication system according to claim 5, further comprising an encoding portion in each of the plurality of transmission systems between the modulator and radio transmission portion, wherein when the transmission data has a reception error, at the time of retransmission of the transmission data, control is executed by the scheduler to perform prescribed encoding in the encoding portion.

8. The radio communication system having a plurality of transmission systems, each of the plurality of transmission systems comprising:
a modulator for which a modulation method is adaptively selected and controlled;
a radio transmission portion to convert the output of the modulator to a radio frequency;
a scheduler to control the modulator so as to perform adaptive modulation according to a propagation path quality, wherein
when there is a transmission error in the transmission data in any of the plurality of data streams transmitted by the plurality of transmission systems, the scheduler controls to read out data from a data buffer so that the transmission data with the transmission error is retransmitted simultaneously in use of at least two transmission systems of the plurality of data streams; and further controls the modulator to perform for the data to be retransmitted, the same adaptive modulation as in the previous transmission; and
a weighting portion; an encoding portion; and a transmission method decision portion in each of the plurality of transmission systems between the modulator and radio transmission portion, wherein
the transmission method decision portion decides, when there is an error on the receiving side in the previous transmission data, a transition method deciding whether to execute control of weighting by the weighting portion at the time of retransmission of the transmission data or to execute control to perform prescribed coding in the encoding portion, and
the radio transmission portion transmits a bit identifying the decided transmission method to the receiving side at the time of retransmission of the transmission data.

* * * * *